United States Patent
Shi

(10) Patent No.: US 7,190,090 B2
(45) Date of Patent: Mar. 13, 2007

(54) REDUNDANT POWER DISTRIBUTION SYSTEM

(75) Inventor: Fong Shi, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 10/615,705

(22) Filed: Jul. 9, 2003

(65) Prior Publication Data

US 2005/0006956 A1  Jan. 13, 2005

(51) Int. Cl.
*H02J 1/10* (2006.01)
(52) U.S. Cl. .............................. 307/18; 307/29; 307/64
(58) Field of Classification Search .................. 307/64, 307/70, 80, 18, 29
See application file for complete search history.

(56) References Cited

U.S. PATENT DOCUMENTS

| | | | | |
|---|---|---|---|---|
| 3,614,599 A * | 10/1971 | Gmuer | ........................ | 323/259 |
| 4,646,219 A * | 2/1987 | Rohl | ........................ | 363/21.07 |
| 5,073,848 A * | 12/1991 | Steigerwald et al. | .......... | 363/65 |
| 5,570,276 A * | 10/1996 | Cuk et al. | ...................... | 363/16 |
| 5,654,859 A | 8/1997 | Shi | | |
| 5,894,412 A * | 4/1999 | Faulk | ........................ | 363/17 |
| 6,191,500 B1 * | 2/2001 | Toy | ........................ | 307/64 |
| 6,459,596 B1 * | 10/2002 | Corzine | ........................ | 363/37 |
| 6,650,556 B2 * | 11/2003 | Dinh et al. | ........................ | 363/65 |
| 2004/0032239 A1 * | 2/2004 | Steigerwald et al. | ......... | 323/274 |
| 2004/0061380 A1 * | 4/2004 | Hann et al. | ........................ | 307/43 |
| 2004/0120169 A1 * | 6/2004 | Schrom et al. | ................ | 363/65 |

FOREIGN PATENT DOCUMENTS

JP        06261536 A  *  9/1994

* cited by examiner

*Primary Examiner*—Chau N. Nguyen
*Assistant Examiner*—Daniel Cavallari
(74) *Attorney, Agent, or Firm*—Ostrager Chong Flaherty & Broltman P.C.

(57) ABSTRACT

A redundant power distribution system (74) that has multiple distribution lines (168) and (174) includes multiple regulators (122). Multiple isolation transformers (124) are coupled to the regulators (122) and have isolation boundaries (261). A redundant regulator device circuit (152) is coupled to the isolation transformers (124) to regulate the multiple distribution lines where M (integer) out of N (integer) distribution lines are required so that the system continues to operate properly. The regulators (122) and the isolation transformers (124) have a non-feedback looped configuration (259) across the isolation boundaries (261).

13 Claims, 8 Drawing Sheets

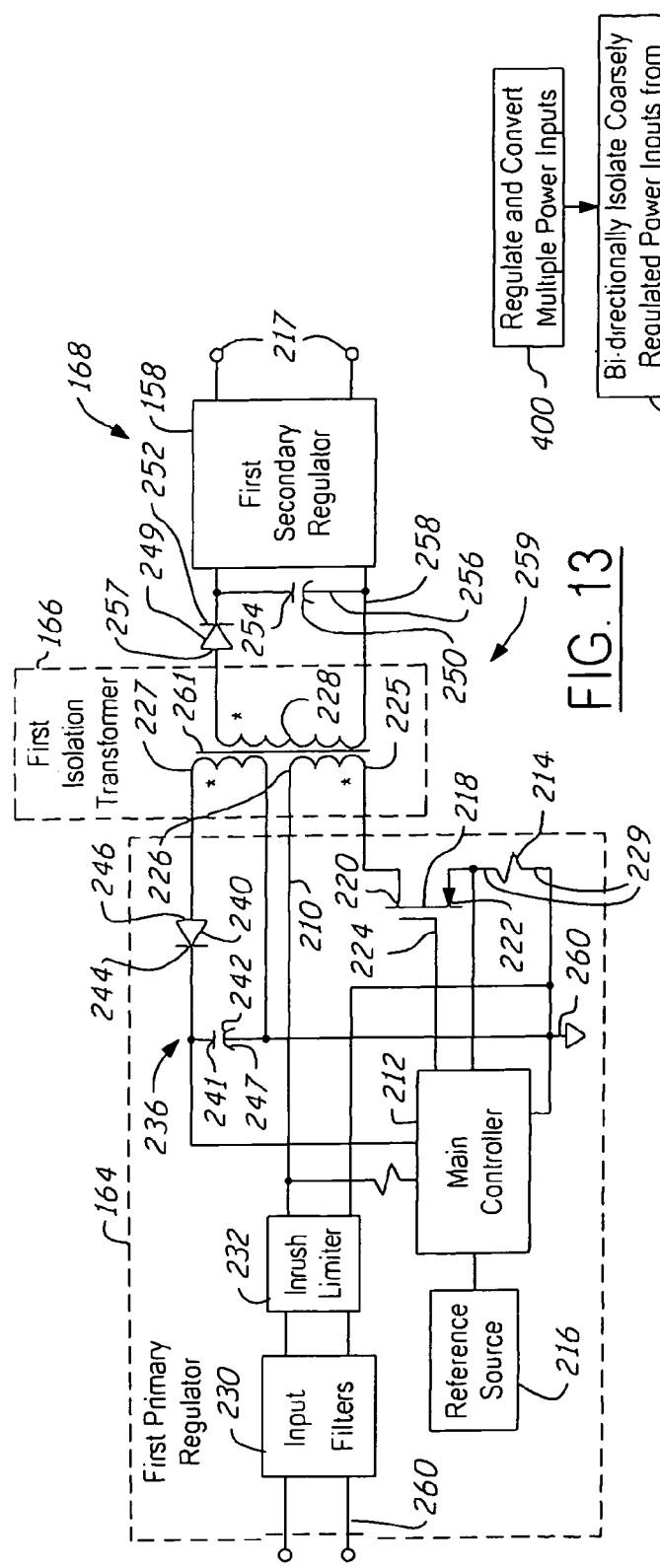
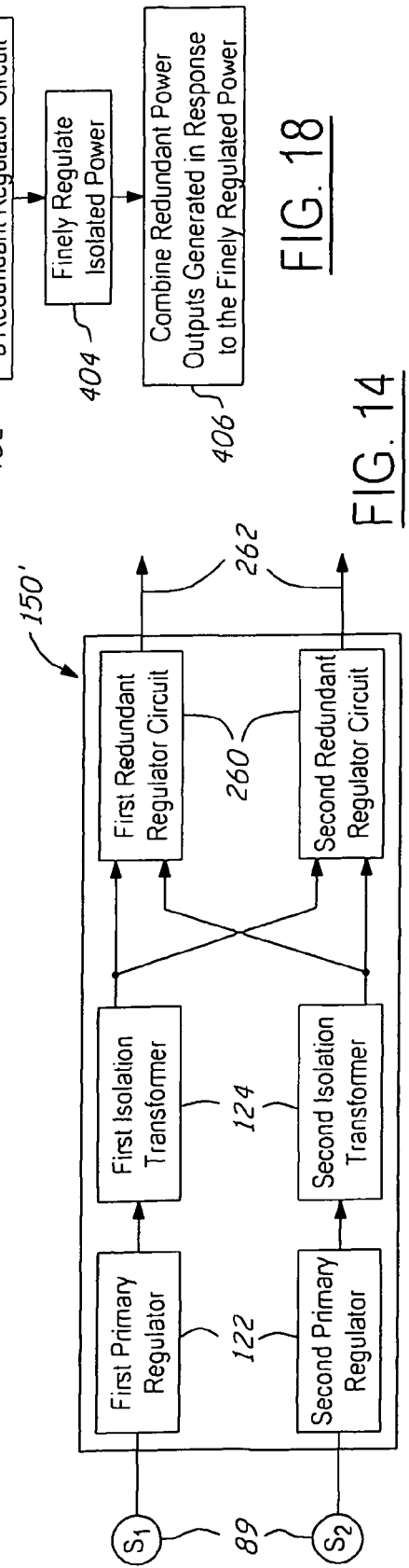
FIG. 13
FIG. 14
FIG. 18

REDUNDANT POWER DISTRIBUTION SYSTEM

RELATED APPLICATION

The present invention is related to U.S. Pat. No. 5,654,859, entitled "FAULT TOLERANT POWER DISTRIBUTION SYSTEM", which is incorporated by reference herein.

TECHNICAL FIELD

The present invention relates generally to power distribution systems, and more particularly, to a system and method of redundantly supplying and distributing power from power sources to loads.

BACKGROUND OF THE INVENTION

Complex electronic power distribution systems exist and are increasingly relied upon to operate within power plants and within various vehicles, such as aircraft, watercraft, and land-based vehicles. Many electronic components contained in the distribution systems are of a critical nature, whereby, it is preferred that functions performed by these components are continuously available as required. It is therefore desirable that these components do not malfunction or become inoperable. Malfunctioning of any of the components can result in a large-scale system malfunction, potential damage to a system, or potential injury to a system operator or occupant.

In order to avoid component and system malfunctioning, redundancy is typically designed into the systems such that when a malfunction does occur, a second or third device is available to continue performing the same or similar function as that of the malfunctioning component or system. Multiple power sources and multiple system components are commonly used to provide redundant power source and system component functions.

Referring now to FIG. 1, an example of a traditional majority redundant system 10 is shown. Multiple power sources 12 are directly coupled to and associated with multiple processing units 14 of a controller 16. Power direct current (DC)/DC converters 18 are coupled between the power sources 12 and the processing units 14. Outputs (not shown) from each processing unit 14 are monitored by the controller 16. When all components within the power distribution system 17 are operating appropriately, the values of each output are approximately equal. The controller 16 determines a majority output value, through use of a voter (not shown), representing approximately a value that is equal to a majority of the outputs, which is determined to be a correct or best response. For example, when two of the outputs are approximately equal, the majority output value is set equal to that of those two outputs.

Each power source 12, processing unit 14, and power converter 18 form a power distribution path or line 22. The distribution system 17 is thus, referred to as a triple redundant power system, since there are three possible power distribution paths.

The distribution system 17 is also a single-fault-tolerant system and as such is capable of withstanding a single line or power distribution path malfunction. In using the system 10, when one power source or converter is not operating appropriately, for example, when a malfunctioning line 24 is not operating appropriately, the remaining two power sources and corresponding converters or lines 26 may remain operating and provide proper power to the controller 16.

When line 24 malfunctions a best response can be determined from the remaining two lines 26. Unfortunately, when a second line is also malfunctioning, such as the one designated as line 28, a majority determination cannot be easily performed, since one may not be able to determine which of the remaining two lines 26 is correct and which is malfunctioning. The redundant system 10 is sometimes referred to as a R(2/3) system, defined as one where two out of three elements are required to provide appropriate outputs at terminal 20.

It is also desirable that power distribution systems isolate both power sources and critical electronic components or systems, sometimes referred to as loads. When a power distribution system does not have isolated power sources, ground current may flow through other undesirable return paths and jeopardize system operations and it also introduces an unsafe environment for system operators.

Thus, without redundancy a "single-point of failure" may occur, causing a critical electronic system to malfunction from, just a single component malfunction. Of course, single-point failures are not acceptable for critical electronic systems.

Although, the system of FIG. 1 provides the above desired redundant features of a power distribution system it has a large number of components, which cause the system to be heavy and costly to manufacture and operate, especially in aerospace applications.

Referring now also to FIG. 2, a traditional DC/DC converter 29, which is representative of the power converters 18 in FIG. 1, is shown. The converter 29 includes a main controller 30 that is coupled to multiple transformers T1, T2, and T3 for voltage conversion, isolation of input voltage at input terminal 31 from output voltage at output terminal 32, and isolation of multiple regulated feedback loops 33. An auxiliary regulator circuit 34 provides power to the controller 30. The converter 29 includes input filters 35, an inrush limiter 36, and other common circuitry known in the art. In operation the controller 30 monitors a reference voltage and the converter output voltage and current through the feedback loops 33 and adjusts voltage output of the converter 29 by adjusting energy flow across the third transformer T3. The controller 30 may activate or deactivate the converter 29 on command, allowing the system 10 to switch between power sources 12, processing units 14, and converters 18 or lines 22.

Each additional transformer downstream from a previous transformer, such as transformers $T_1$ and $T_3$ being downstream from transformer $T_2$, tends to have voltage and/or current that is feedback to the controller 30 and crosses isolation boundaries 37 contained within the transformers $T_1$, $T_2$, and $T_3$. The configuration of the converter 19 is complex and costly, especially due to the number of transformers that must be utilized for isolation of the feedback loops 33 and the presence of the auxiliary regulator circuit 34.

Referring now to FIG. 3, another example of a majority redundant power distribution system 38 utilizing "ORing" diodes 39 is shown. Two power sources 40 are utilized rather than three, as with the previous example, and are coupled to three processing units 41 of a controller 42. Diodes 39 are coupled between outputs 43 of a pair of power DC/DC converters 44 and input 45 of a center one 46 of the processing units 41. Diodes 39 are referred to as "ORing" diodes because they operate in a logical OR manner to provide power from either the one designated 48 or the other designated 50 of the power converters 44 to the center-processing unit 46. Thus, for example, when either power converter 48 or 50 is malfunctioning, the other or properly operating power converter supplies power to the center-processing unit 46 through diodes 39.

Although, the configuration of FIG. 3 provides a low cost and simple redundant power distribution system with fewer power converters relative to and unlike that of the system of FIG. 1, it also, unfortunately, has associated disadvantages and is a single-point of failure system. One disadvantage is that the diodes 39 inherently cause a drop in voltage between the sources 40 and the center-processing unit 46 that causes the processing units 46 to operate with an undesirable input voltage level, which can result in an erroneous voltage level at output 52. Another disadvantage with system 38 is that when the center-processing unit 46 is malfunctioning both converters 44 may become inoperable, such as in a situation when the processing unit 46 is shorted to ground. Additionally, system 38 is limited in its ability to switch between power sources 40, processing units 41, and converters 44; for example, processing unit 46 continuously receives power from either source 40 due to the ORing configuration. The above associated disadvantages are also true when multiple sets of ORing diodes are utilized.

It is therefore desirable to provide a redundant power distribution system that does not exhibit the above stated disadvantages and that provides reliability at a level that is at least equal to that of a triple redundant system, that provides separate lines of regulated and isolated output power, and that minimizes number of system components, weight, and costs involved therein.

SUMMARY OF THE INVENTION

The present invention provides a system and method of redundantly supplying and distributing power from power sources to loads. A redundant power distribution system having multiple distribution lines is provided. The system includes multiple regulators. Multiple isolation transformers are coupled to the regulators and have isolation boundaries. An R(M/N) device circuit is coupled to the isolation transformers. The regulators and the isolation transformers have a non-feedback looped configuration across the isolation boundaries.

One of several advantages of the present invention is that it provides an efficient power distribution system that has reliability of a triple redundant system, but at the same time minimizes number of system components. In so doing, the present invention provides a simplified power distribution system that is lightweight and cost effective.

Another advantage of the present invention is that it provides a redundant regulator circuit that exhibits a low drop in voltage across the regulator, that has an adjustable output voltage, that does not have any reverse current flow therethrough, that has over current protection, thermal protection, and that is capable of withstanding reverse voltage on input.

Furthermore, the present invention is flexible and versatile in that it provides multiple power distribution configurations that may be easily modified for various power distribution applications.

The present invention itself, together with further objects and attendant advantages, will be best understood by reference to the following detailed description, taken in conjunction with the accompanying drawing.

BRIEF DESCRIPTION OF THE DRAWINGS

FIG. 13 is a block diagrammatic and schematic view of the distribution line of FIG. 11 in accordance with another embodiment of the present invention;

FIG. 14 is a block diagrammatic and schematic view of a dual redundant power distribution system incorporating use of a pair of redundant regulator circuits in accordance with another embodiment of the present invention;

FIG. 18 is a logic flow diagram illustrating a method of redundantly supplying and distributing power from a plurality of power sources to a plurality of loads in accordance with another embodiment of the present invention.

DETAILED DESCRIPTION OF THE PREFERRED EMBODIMENT

Figure 1:
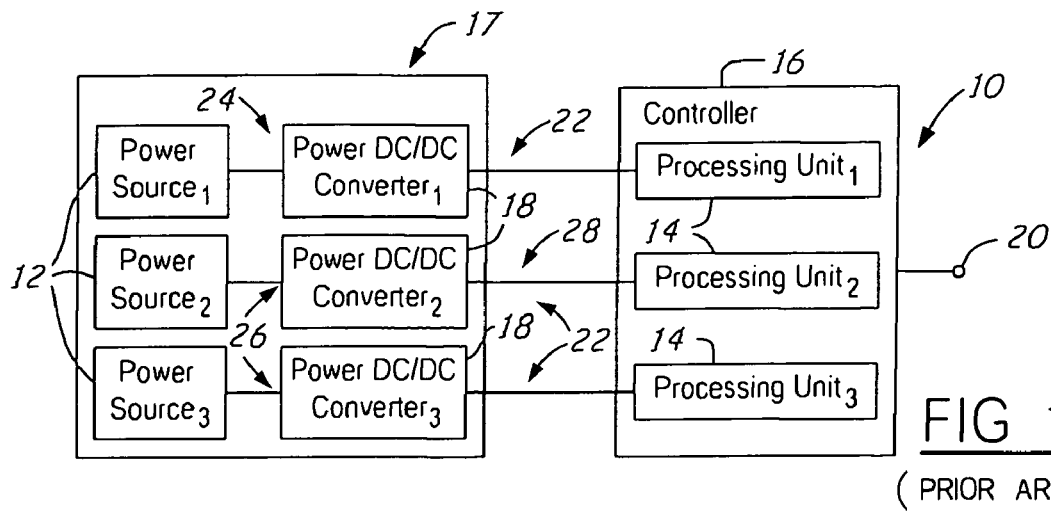
FIG. 1 is a block diagrammatic view of a traditional redundant power distribution system.
Figure 2:
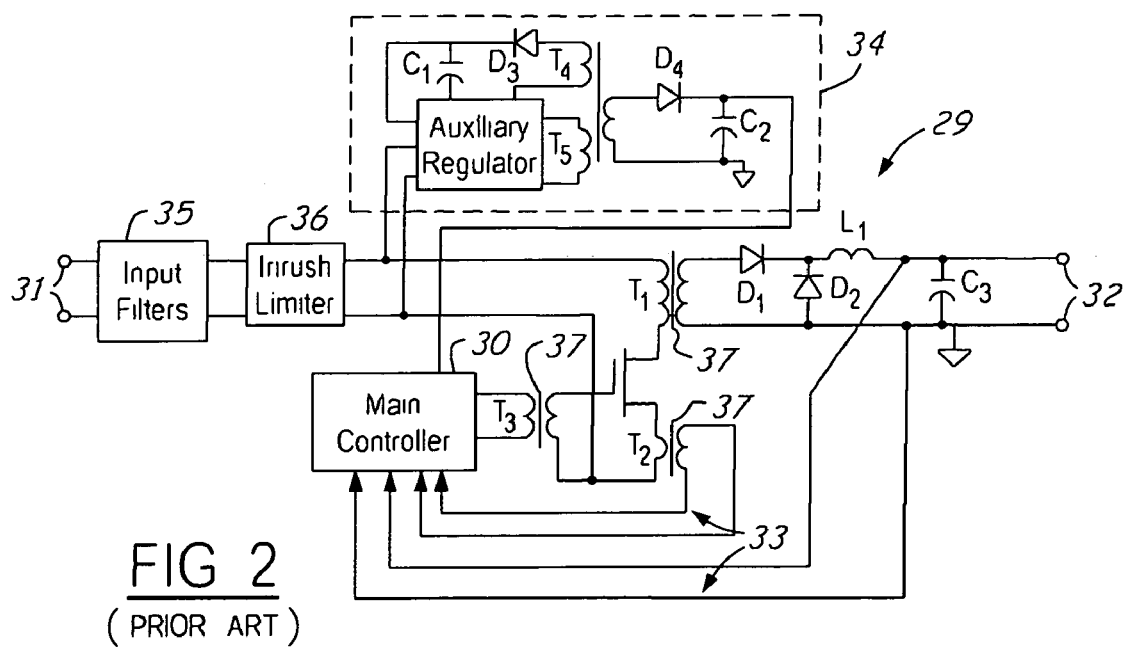
FIG. 2 is a block diagrammatic and schematic view of a traditional DC/DC converter.
Figure 3:
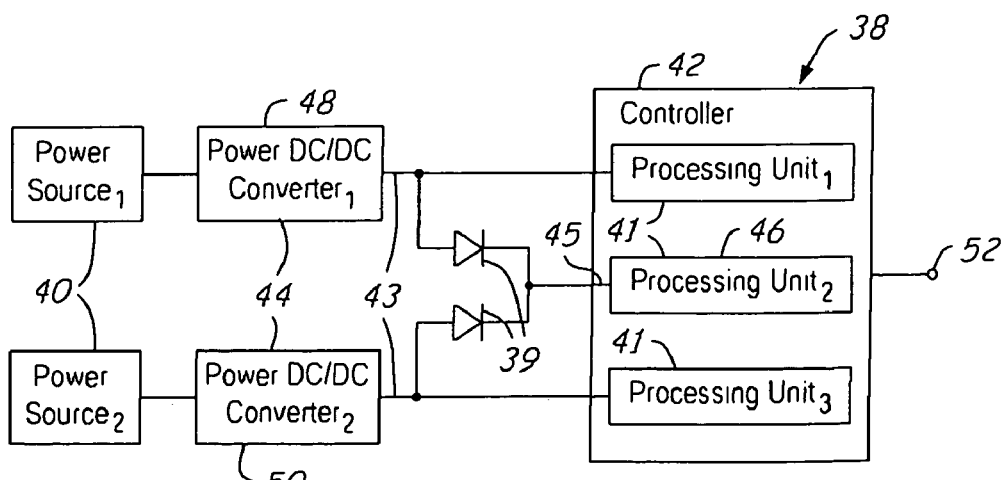
FIG. 3 is a redundant power distribution system incorporating use of "ORing" diodes.

In each of the following figures, the same reference numerals are used to refer to the same components. While the present invention is described with respect to a system and method of delaying and preventing unwanted intrusions within an aircraft, the present invention may be adapted for various applications including ground-based vehicles, aeronautical vehicles, watercraft, and other applications known in the art that where prevention of unwanted intrusions is desired.

In the following description, various operating parameters and components are described for one constructed embodiment. These specific parameters and components are included as examples and are not meant to be limiting.

Also, in the following description an R(M/N) device circuit refers to a redundant circuit having multiple redundant modules or devices with multiple inputs and a common output. Two examples, namely an R(1/2) switch and an R(1/2) redundant regulator circuit, of an R(M/N) device circuit are described in detail below. Other R(M/N) device circuits may be envisioned by one skilled in the art. R(M/N) is defined as reliability of a redundant system or circuit containing N elements where M of the N elements are required so that the system or circuit operates properly.

Figure 4:
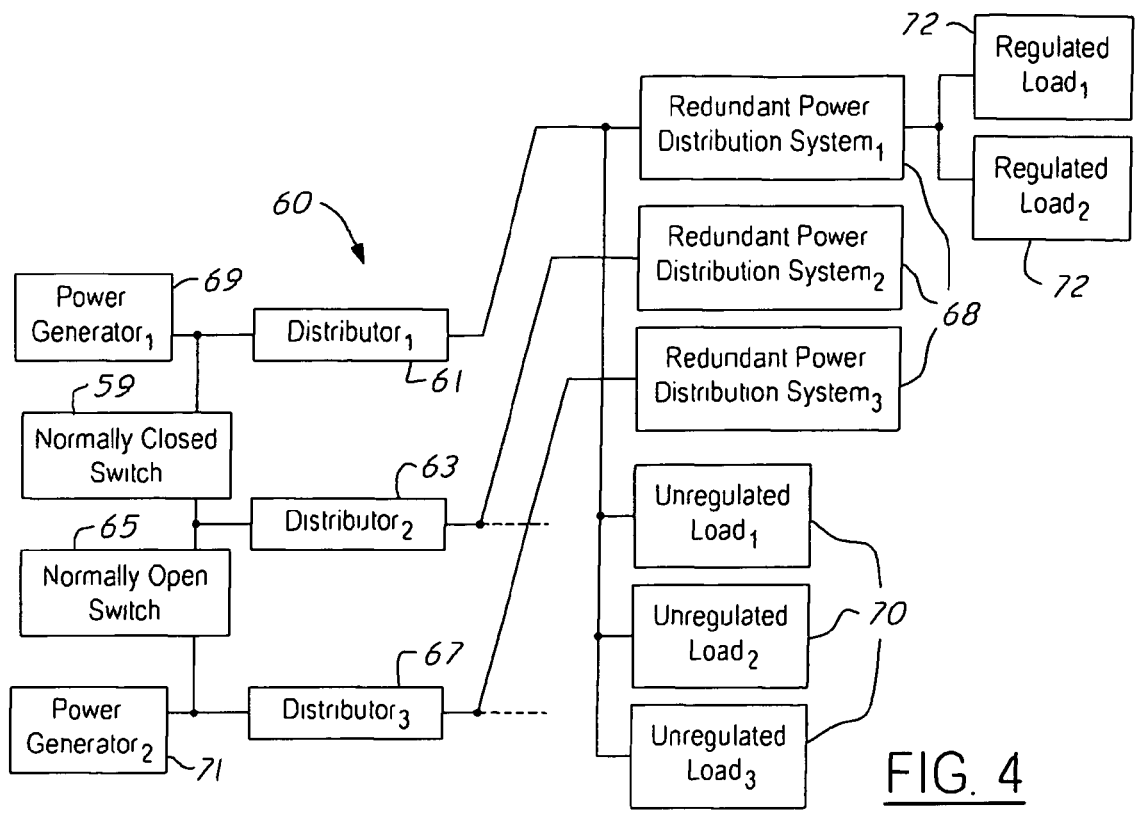
FIG. 4 is block diagrammatic view of a power distribution network in accordance with an embodiment of the present invention.

Referring now to FIG. 4, a block diagrammatic view of a power distribution network 60 in accordance with an embodiment of the present invention is shown. The network 60 includes power generators 69, 71 that generate power to supply multiple unregulated loads 70 and regulated loads 72. Distributors 61, 63, 67 are coupled to the generators 69, 71 and distribute power from the generators to multiple regulated or redundant power distribution systems 68 and unregulated loads 70. The unregulated loads 70, for example, may include lights, fans, motors, heaters, blowers, or other unregulated loads known in the art. On the other hand, regulated loads 72, which are coupled to the redundant systems 68, may include devices such as computers, sensors, navigation systems, or other regulated loads known in the art. In general, the regulated loads 72 are more sensitive to voltage line swing or variations and have their received power signal-conditioned before being utilized therein. Without the received power being signal-conditioned the regulated loads 72 may operate inappropriately, degrade over time, or become inoperable. The regulator circuits 68 are described in detail below.

A normally closed switch 59 is coupled to a first distributor 61 and a second distributor 63. A normally open switch 65 is coupled to the second distributor 63 and to a third distributor 67. States of the switches 59 and 65 change when either of the power generators 69, 71 are operating inappropriately. For example, when the first power generator 69 is operating inappropriately, the normally closed switch 59 opens and the normally open switch 65 closes, such that the second power generator 71 is supplying power to the second distributor 63 and the third distributor 67.

Figure 5:
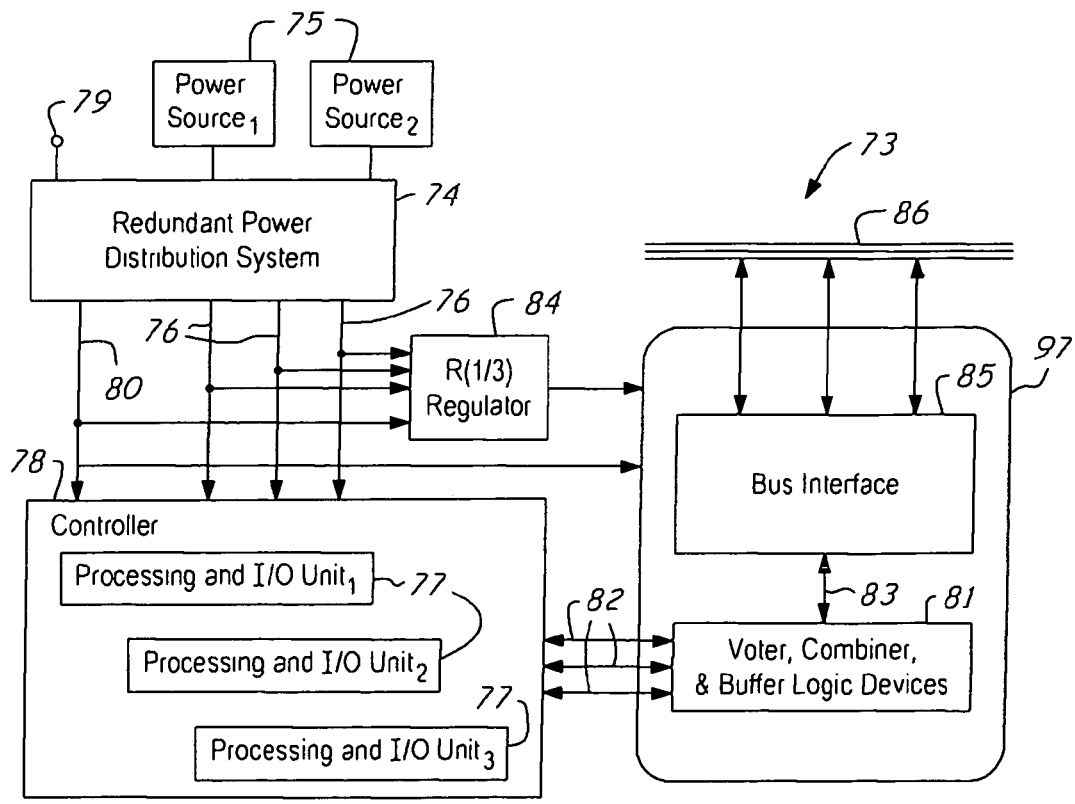
FIG. 5 is a block diagrammatic view of a regulated power distribution circuit in accordance with an embodiment of the present invention.

Referring now to FIG. 5, a block diagrammatic view of a regulated load power distribution circuit 73 is shown. The regulated load circuit 73 includes a redundant power distribution system 74 that receives power from multiple power sources 75. The redundant system 74 provides three isolated and regulated power output lines 76 to three processing and I/O units 77 of a controller 78. The redundant system 74 has a primary ground terminal 79 and a secondary ground terminal 80.

Voter, combiner, and buffer logic devices 81 determine a majority output value, representing approximately a value that is equal to a majority of the outputs 82, which is determined to be a correct or best response. For example, when two of the outputs 82 are approximately equal, the majority output value, in the form of a majority output signal 83, is set equal to that of those two outputs. The devices 81 may be an integral part of the controller 78 or separate devices as shown.

An R(1/3) regulator 84 is coupled to the lines 76 and supplies power having a highly reliable and regulated voltage level corresponding to a proper voltage level of the lines 76 to a serial interface module 97. The module 97 contains a bus interface 85 where it is then used to transmit the majority signal 83 to a system data bus 86. See R(1/2) dual-redundant regulator circuit of FIG. 12 for further detailed explanation of a sample R(1/3) triple-redundant regulator circuit that may be used for the R(1/3) circuit 84, where only one of three regulator circuits is then needed for operation of module 97.

The controller 78 and the processing units 77 may be microprocessor based such as a computer having a central processing unit, memory (RAM and/or ROM), and associated input and output buses. The controller 78 and the processing units 77 may be an integrated circuit or form of various logic devices. The processing units 77 may be part of the controller 78, as shown, or may be individual separate devices.

In the following FIGS. 6–17, several redundant power distribution systems, a distribution switch, and a redundant regulator circuit are shown. Each distribution system is a single-fault-tolerant system. The distribution systems, the distribution switch, and the regulator circuit are shown for example purposes only; all of which may be modified to include any number of power sources, switches, converters, regulators, isolation transformers, etc. This will become more evident in view of the following description.

Figure 6:
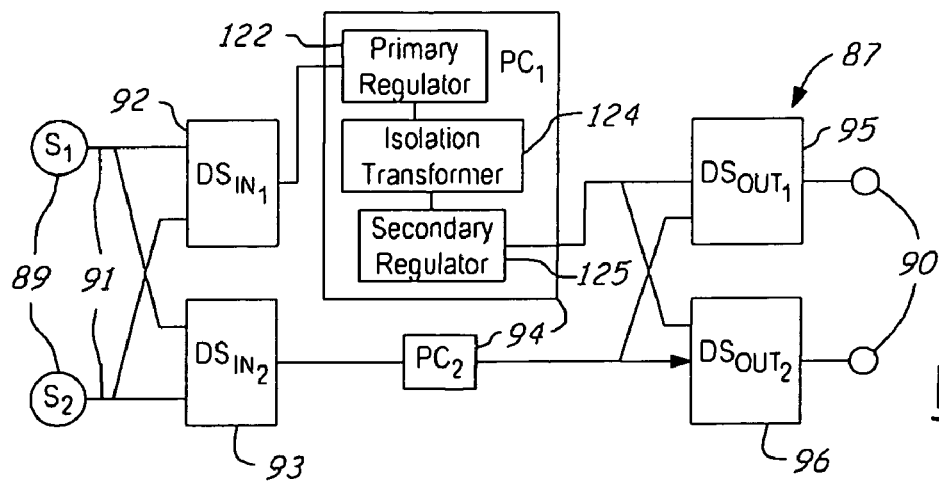
FIG. 6 is a block diagrammatic and schematic view of a dual redundant power distribution system incorporating use of distribution switches in accordance with an embodiment of the present invention.

Referring now to FIG. 6, a block diagrammatic and schematic view of a dual redundant power distribution system 87 incorporating use of distribution switches 92, 93 in accordance with an embodiment of the present invention is shown. The dual redundant system 87 includes a pair of power sources 89 that are coupled to regulated loads (not shown) via output terminals 90. The sources 89 have a pair of power bus terminals 91. A first input distribution switch 92 and a second input distribution switch 93 are each coupled to each bus terminal 91. A pair of power converters 94 are respectively coupled to the switches 92 and 93. A first output distribution switch 95 and a second output distribution switch 96 are each coupled to each of the converters 94. The output terminals 90 ultimately receive power from the output switches 95 and 96. Distribution switches may be added upstream or downstream with respect to the converters 94.

Figure 7:
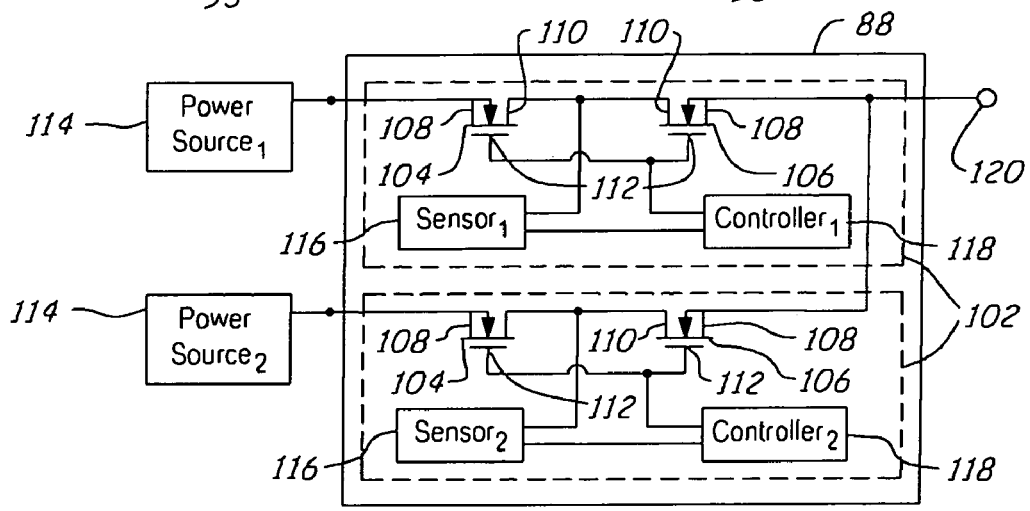
FIG. 7 is a block diagrammatic and schematic view of a distribution switch in accordance with an embodiment of the present invention.

An example of a distribution switch as mentioned with respect to FIG. 6 is shown in FIG. 7. The distribution switch 88 includes a pair of power distribution modules 102. Each module 102 includes a first power transistor 104 in series with a second power transistor 106. The first transistor 104 and the second transistor 106 have source terminals 108, drain terminals 110, and gate terminals 112, respectively. Source terminals 108 are separately coupled to associated power sources 114, which may represent power received from any device including sources 89 and converters 94 as described for FIG. 6. The drain terminals 110 are coupled to each other and are also coupled to a sensor 116. The gate terminals 112 are coupled to each other and to controllers 118, which may be separate from the switch 88 and part of a single controller. The controller 118 may also be microprocessor based and formed of various logic devices.

The sensors 116 are coupled to the controllers 118 and determine whether reverse current, from load terminal 120 to power sources 114, flows through the power transistors 104 and 106. The sensors 116 generate a reverse current signal in response to detection of reverse current flow. The controllers 118 in response to the reverse current signal discharge voltage on the gate terminals and thereby, switch the transistors 104 and 106 to an "OFF" state. The switch 88 may be referred to as an R(1/2) switch since one-out-of-two elements or power distribution paths within the switch 88 is sufficient for proper operation. See U.S. Pat. No. 5,654,859 incorporated by reference herein for a more detailed explanation of a distribution switch.

Referring again to FIG. 6, there is minimal voltage drop across the distribution switches 92, 93. Also, the distribution switches 92, 93 are capable of withstanding single point failure (SPF). SPF describes inoperability of a system due to one point of failure of any kind within a particular circuit of concern.

The power converters 94 in FIG. 6 may include a primary regulator 122 (only one is shown) in series with an isolation transformer 124 (only one is shown), which is again in series with a secondary regulator 125. The regulators 122 maintain a proper input voltage for the load terminals 90 and provide DC/DC conversion. For example, a source may supply 28V DC, which may then be converted to and regulated near 5V DC by the regulator 122. The transformers 124 provide isolation between the load terminals 90 and the sources 89. Isolation between terminals 90 and sources 89 is desired to eliminate ground-loop current flow through the power system 87. The regulator 122 and the transformer 124 and the regulator 125 are shown in further detail in FIG. 13.

Figure 8:
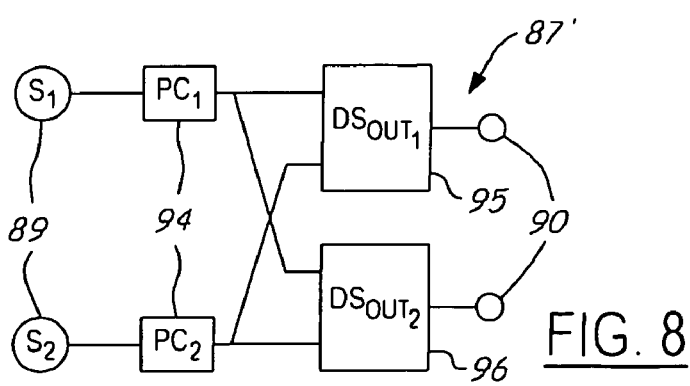
FIG. 8 is a block diagrammatic and schematic view of the dual redundant power distribution system of FIG. 6 simplified and in accordance with another embodiment of the present invention.

Referring now to FIG. 8, a block diagrammatic and schematic view of a simplified dual redundant power distribution system 87' and in accordance with another embodiment of the present invention is shown. The dual redundant system 87, of FIG. 6, may be simplified when weight and costs are deemed to have a higher priority than difference in reliability between the dual redundant system 87 and the simplified dual redundant system 87', which in one embodiment is approximately equal to 0.000266 wherein the dual redundant system 87 has a reliability level of 0.998890 and the simplified dual redundant system 87' has a reliability level of 0.998624. Reliability values are determined using Bayes Theory for Reliability Estimation. As such, the input distribution switches 92 and 93 are eliminated and the power sources 89 are directly coupled to the converters 94. In so doing, the number of components within the dual redundant system 87 is reduced to form the simplified dual redundant system 87', thereby reducing weight and costs. Reliability may be determined using mean time to failure quantities for each device within a system or circuit under evaluation as is known in the art.

Figure 9:
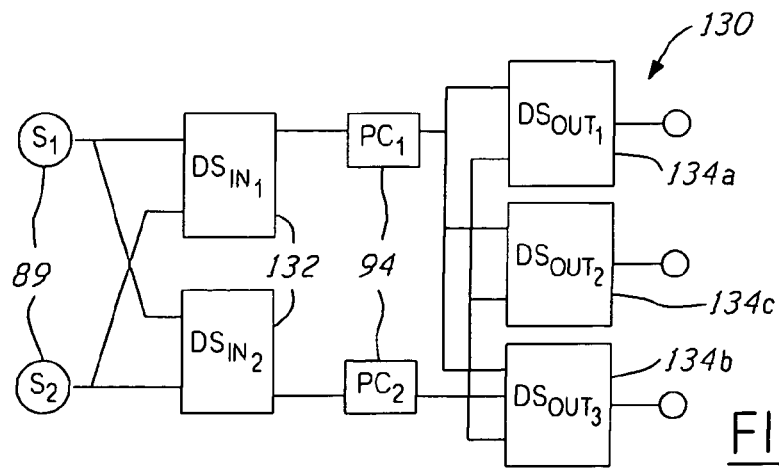
FIG. 9 is a block diagrammatic and schematic view of a triple redundant power distribution system incorporating distribution switches in accordance with another embodiment of the present invention.

Referring now to FIG. 9, a block diagrammatic and schematic view of a triple redundant power distribution system 130 incorporating two input distribution switches 132 and three output distribution switches 134a, 134b, 134c in accordance with another embodiment of the present invention is shown. The dual redundant system 87 in FIG. 6 for two independent loads (not shown) again is modified to form the triple redundant system 130 for three independent loads (not shown) by introducing an additional output distribution switch 134c, which is also coupled to each of the converters 94. Reliability of the triple redundant system 130 is approximately equal to 0.998891. Although, any number of distribution switches may be used, introduction of additional switches beyond that as shown in FIG. 9 may or may not provide any added benefit, since with an increased number of components comes an increased potential of any one component malfunctioning at any given instance in time. Thus, for each additional switch the amount of increase in system overall reliability diminishes.

Figure 10:
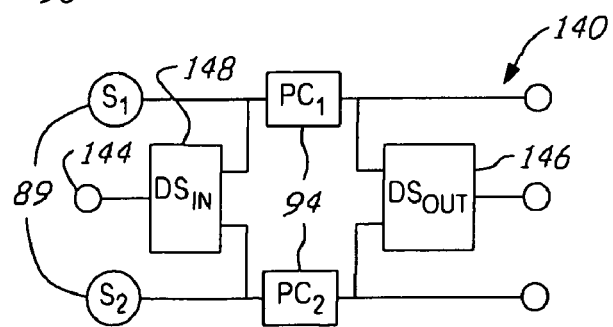
FIG. 10 is a block diagrammatic and schematic view of a triple redundant power distribution system incorporating distribution switches and having an additional power bus in accordance with another embodiment of the present invention.

Referring now to FIG. 10, a block diagrammatic and schematic view of a triple redundant power distribution system 140 incorporating distribution switches and having an additional power bus terminal 144 in accordance with another embodiment of the present invention is shown. The embodiment of FIG. 10 is shown to illustrate another example of a triple redundant system with use of only a single output distribution switch, such as switch 146, and to also illustrate that an additional power bus terminal or power source, such as terminal 144, may be formed through use of a single input distribution switch 148 coupled to each source 89.

Figure 11:
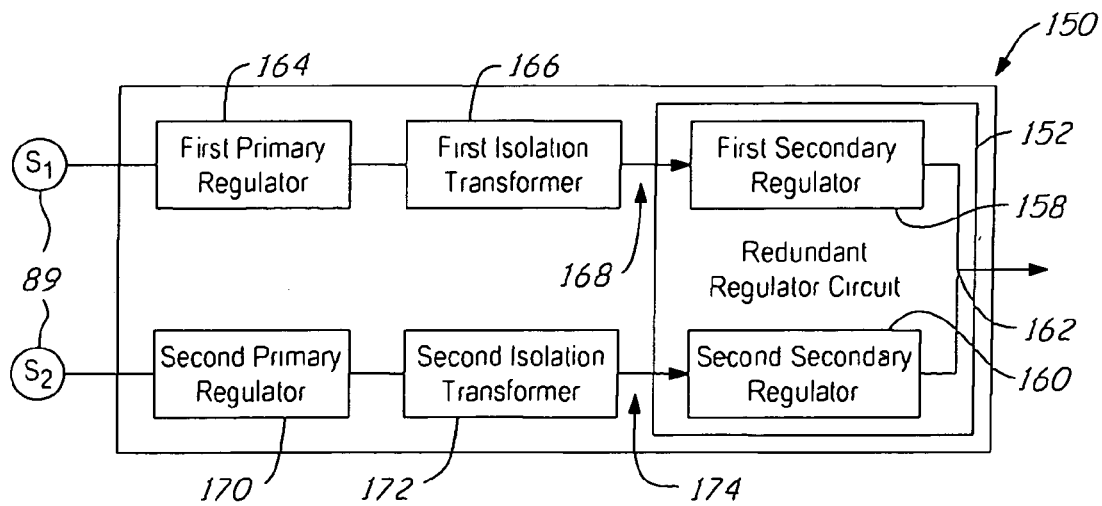
FIG. 11 is a block diagrammatic and schematic view of a dual redundant power distribution system incorporating use of a redundant regulator circuit in accordance with another embodiment of the present invention.

Referring now to FIG. 11, a block diagrammatic and schematic view of a dual redundant power distribution system 150 incorporating use of a redundant regulator circuit 152 in accordance with another embodiment of the present invention is shown. The dual redundant system 150 includes a pair of primary regulators 164, 170 coupled to a pair of isolation transformers 166, 172 which are coupled to the regulator circuit 152. The regulator circuit 152 includes a first secondary regulator 158 and a second secondary regulator 160 that are coupled to the isolation transformers 166, 172, respectively. The regulators 158 and 160 have a common output terminal 162. A first primary regulator 164, a first transformer 166, and the first secondary regulator 158 form a first power distribution line 168. A second primary regulator 170, a second transformer 172, and the second secondary regulator 160 form a second power distribution line or possible power distribution path 174. The regulators 158 and 160 may be linear regulators having low dropout voltage, no reverse current, and with thermal and overcurrent protection, such as for example regulators of the type LT1764 from Linear Technology Corporation. The regulator circuit 152 is illustrated in greater detail in FIG. 12 and the distribution line 168 is illustrated in greater detail in FIG. 13.

Figure 12:
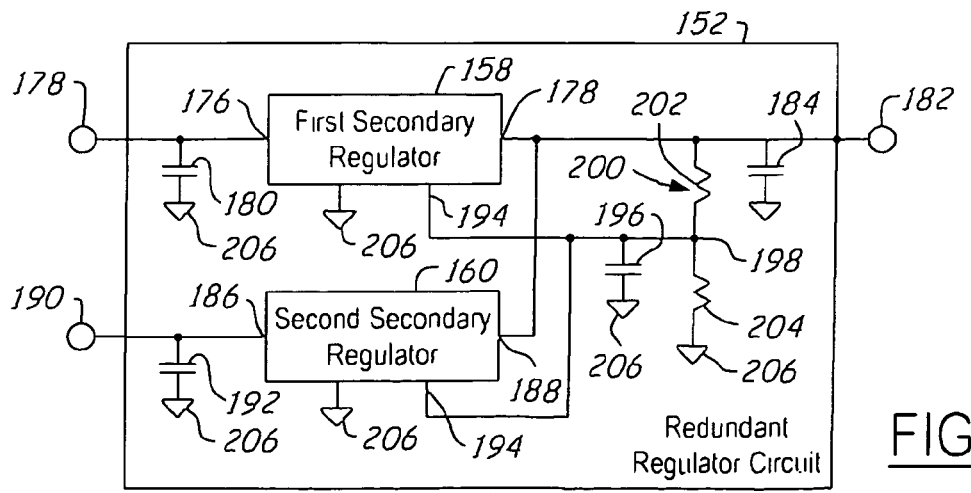
FIG. 12 is a schematic diagram of a redundant regulator circuit in accordance with another embodiment of the present invention.

Referring now to FIG. 12, a schematic diagram of the regulator circuit 152 in accordance with another embodiment of the present invention is shown. The regulator circuit 152 includes the first regulator 158 that has a first input 176 and a first output 178. The first input 176 is coupled to a first circuit input terminal 178 and to a first capacitor 180. The first output 178 is coupled to a circuit output terminal 182 and to a second capacitor 184. The second regulator 160 has a second input 186 and a second output 188. The second input 186 is coupled to a second circuit input terminal 190 and to a third capacitor 192. The second output 188 is also coupled to the circuit output terminal 182.

The regulators 158 and 160 each have an adjustment terminal 194, which are coupled together, to a fourth capacitor 196, and to a center terminal 198 of a voltage divider circuit 200. Divider circuit 200 provides adjustment for output voltage on terminal 182. The voltage divider circuit 200 includes a first resistor 202 coupled between the circuit output terminal 182 and the center terminal 198 and a second resistor 204 coupled between the center terminal 198 and ground 206. The capacitors 180, 184, 192, and 196 are each also coupled to ground 206 and perform as low-pass filters minimizing noise within the regulator circuit 152.

The regulator circuit 152 exhibits low dropout voltage between the circuit input terminals 178 and 190 and the circuit output terminal 182. In one embodiment, the dropout voltage is less than 1V. Inherent design of the regulators 158 and 160 and configuration of the circuit 152 prevent reverse current flow from the circuit output terminal 182 and the circuit input terminals 178 and 190, provide capability of withstanding reverse voltage across the input terminals 178 and 190 and the output terminal 182, and provide thermal-limiting. The regulator circuit 152 may be referred to as a R(1/2) circuit, similar to that of switch 88 of FIG. 7, since one-out-of-two elements or power distribution paths within the circuit 152 is sufficient for proper operation.

Referring now to FIG. 13, a block diagrammatic and schematic view of the distribution line 168 is shown. The distribution line 174 is similar to that of 168. The primary regulator 164 includes a main current supply line 210 that supply power to the first secondary regulator 158 and is controlled via a main controller 212. The controller 212 monitors voltage across a house-keeping power source circuit 236 and compares that voltage with a reference voltage from a reference source 216 to adjust amount of current passing across the first isolation transformer 166 and thus adjusting voltage across the resistor 214 to be approximately equal to the reference voltage and thereby regulating voltage received by the regulator 158. The controller 212 operates in current-mode control by monitoring voltage across a current feedback resistor 214. The controller 212 generates an error signal in response to difference between voltage of the housekeeping circuit 236 and voltage of the reference 216. The error signal is intercepted by a voltage signal across the resistor 214 where current flows therethrough. This intercepted voltage signal is a pulse width modulated signal to activate and deactivate a power switch 218. Pulse width of the modulated signal is increased or decreased to increase or decrease energy across the transformer coil 227. The controller 212 may also be microprocessor based or formed of various mixed-signal devices.

The switch 218 has a drain terminal 220, a source terminal 222, and a gate terminal 224. The drain terminal 220 is coupled to a primary return leg 225 of the transformer 166. The transformer 166 includes a primary coil 226, a first secondary coil 227, and a second secondary coil 228. The source terminal 222 is coupled to the resistor 214 and to the controller 214. The gate terminal 224 is coupled to the controller 212. Both legs 229 of the resistor 214 are coupled to the controller 212.

The primary regulator 164 also includes input filters 230, an inrush limiter 232, and the housekeeping circuit 236. The input filters 230 filter power signals received via input terminal 238. The inrush limiter 232 is coupled to the input filters 230 and limits surge current passing through the primary regulator 164. The housekeeping circuit 236 is coupled to the controller 212, and to a first secondary coil 227 of the transformer 166. The source circuit 236 includes a first diode 240 and a first capacitor 242 for directing and filtering power from the transformer 166. Cathode terminal 244 of the diode 240 is coupled to the controller 212 and to a positive terminal 241 of the capacitor 242. Anode terminal 246 of the diode 240 is coupled to the secondary coil 227. Negative terminal 247 of the capacitor 242 is coupled to primary ground 260.

A second diode 249 and a second capacitor 250 direct and filter power received from the secondary coil 228. Cathode terminal 252 of the diode 249 is coupled to the regulator 158 and a positive terminal 254 of the capacitor 250. Anode terminal 257 of the diode 249 is coupled to the secondary coil 228. Negative terminal 256 of the capacitor 250 is coupled to a secondary ground 258, which is different and isolated from primary ground 260.

Note that the primary regulator 164 and the isolation transformer 166 are in a non-feedback looped configuration 259 such that there is not a feedback loop across isolation boundary 261 of the isolation transformer. The non-feedback looped configuration 259 provides simplicity in design of the distribution line 168 and minimizes number of isolation transformers utilized and thus also minimizes costs involved therein.

Referring now to FIG. 14, a block diagrammatic and schematic view of a dual redundant power distribution system 150' incorporating use of a pair of redundant regulator circuits 260 with primary regulator circuits 122 and isolation transformers 124 in accordance with another embodiment of the present invention is shown. Instead of a single regulator circuit being coupled to each of the isolation transformers 124, as in the embodiments of FIG. 11, the redundant regulator circuits 260 are coupled to each of the isolation transformers 124. Each redundant regulator circuit 260 has a separate output terminal 262.

Figure 15:
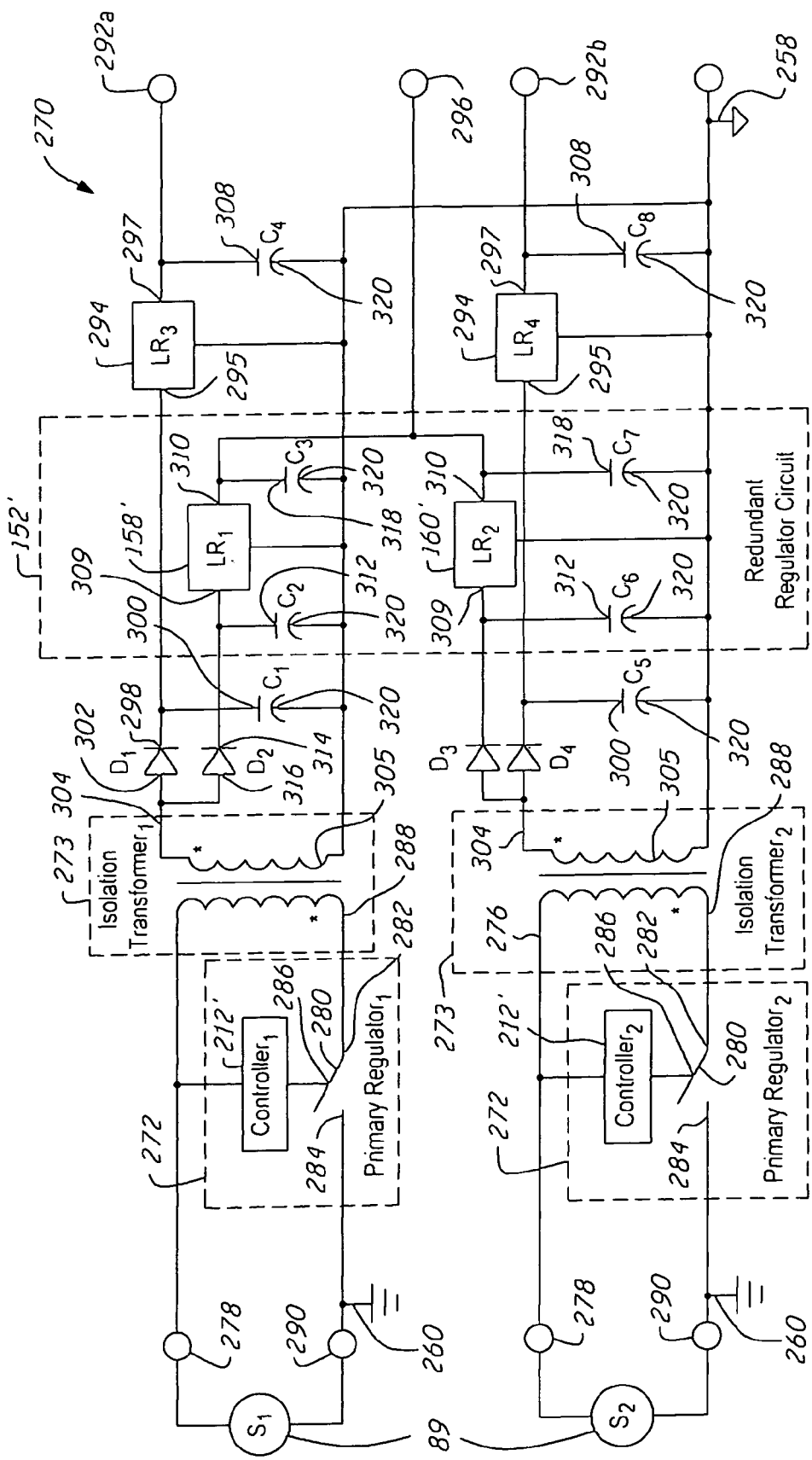
FIG. 15 is a block diagrammatic and schematic view of a triple redundant power distribution system incorporating use of a redundant regulator circuit in accordance with another embodiment of the present invention.

Referring now to FIG. 15, a block diagrammatic and schematic view of a triple redundant power distribution system 270 incorporating use of a redundant regulator circuit 152' in accordance with another embodiment of the present invention is shown. The distribution system 270 includes a pair of primary regulators 272, a pair of isolation transformers 273, and a redundant regulator circuit 152', which are similar to the regulators, transformers, and regulator circuit, respectively, of FIG. 11. The triple redundant system 270 has three positive output terminals 292a, 292b, and 296 that provide three separate regulated power sources that are isolated from the primary regulators 272.

The primary regulators 272 include a pair of controllers 212' that are coupled to primary receiving legs 276 of transformers 273 and to positive terminals 278 of sources 89. Switches 280 having drain terminals 282, source terminals 284, and gate terminals 286 are coupled to primary return legs 288 of the transformers 273, to negative terminals 290 of the sources 89, and to the controller 212', respectively.

Voltage at two output terminals 292a, 292b are provided by a pair of secondary regulators 294 having input terminals 295 and output terminals 297. Voltage at a third or common output terminal 296 is provided by the redundant circuit 152'. The regulators 294 are coupled to respective cathode terminals 298 of diodes D1 and D4, to ground 258, and to the output terminals 292. Cathode terminals 298 are also coupled to respective positive terminals 300 of capacitors C1 and C5. Anode terminals 302 of the diodes D1 and D3 are coupled to secondary reception legs 304 of secondary coils 305 of the transformers 273. Positive terminals 308 of a pair of capacitors C4 and C8 are coupled to the output terminals 292.

The regulator circuit 152' includes a pair of regulators 158' and 160' having input terminals 309 and output terminals 310. The regulator 158' is coupled between capacitors C2 and C3 and the regulator 160' is coupled between capacitors C6 and C7. Positive terminals 312 of the capacitors C2 and C6 are coupled to cathode terminals 314 of diodes D2 and D3. Anode terminals 316 of the diodes D2 and D3 are coupled to legs 304. Positive terminals 318 of C3 and C7 are coupled to output terminals 296.

Regulators 158', 160', and 294 and negative terminals 320 of capacitors C1–C8 are coupled to ground terminal 258.

The diodes D1–D4 direct current from the legs 304 to the regulators 158', 160', and 294 whereas the capacitors C1–C5 filter power received by the regulators 158', 160', and 294 and the output terminals.

Figure 16:
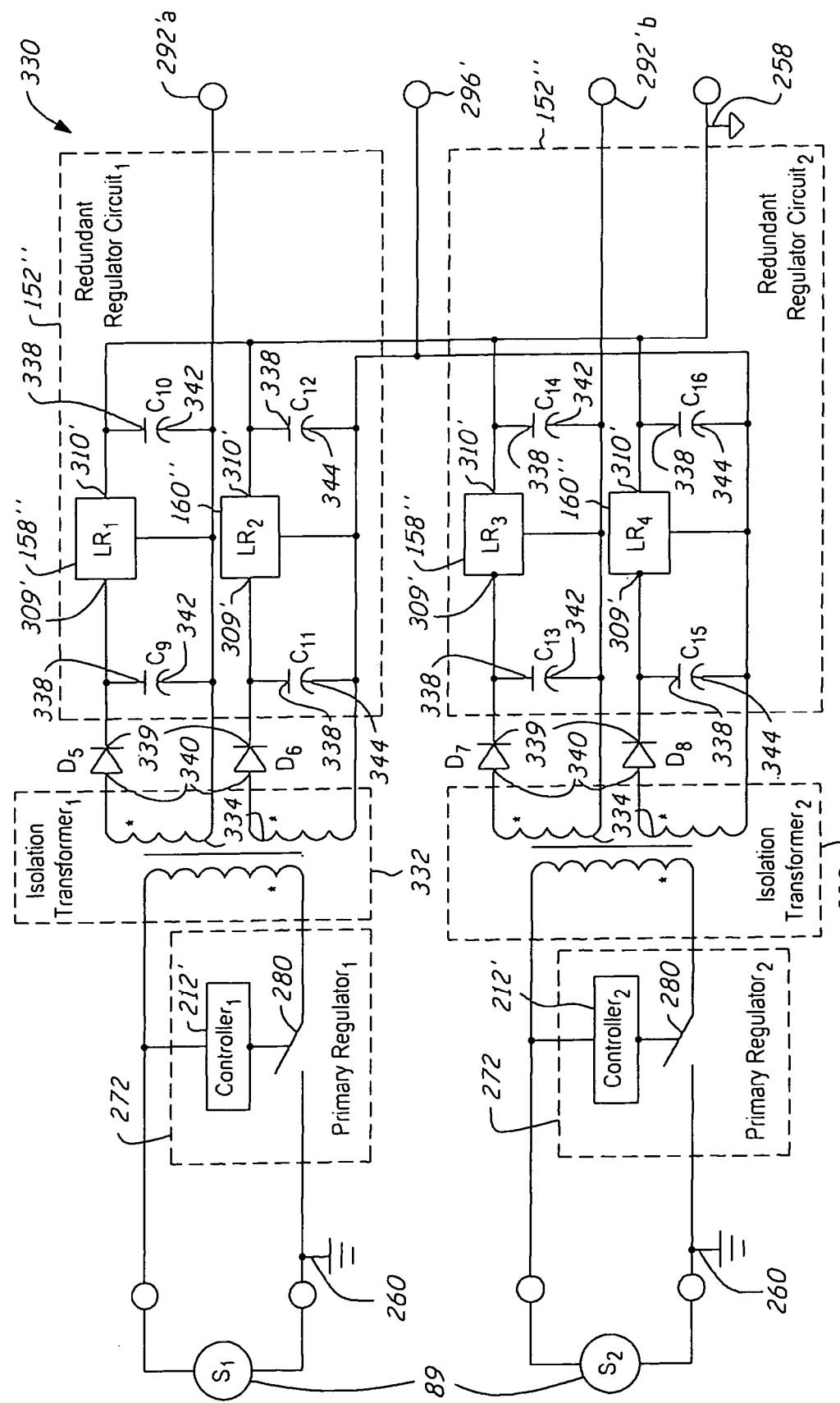
FIG. 16 is a block diagrammatic and schematic view of a triple redundant power distribution system incorporating use of a pair of redundant regulator circuits in accordance with another embodiment of the present invention.

Referring now to FIG. 16, a block diagrammatic and schematic view of a triple redundant power distribution system 330 incorporating use of redundant regulator circuits 152" in accordance with another embodiment of the present invention is shown. The embodiment of F*igure* 16 is a modification of the embodiment of FIG. 15 to provide negative output voltage at output terminals 292'*a*, 292'*b*, 296' and as such has similar reliability. Isolation transformers 332 each have a pair of secondary coils 334 as opposed to a single secondary coil, such as coils 305 in FIG. 15. A pair of redundant regulator circuits 152" are also utilized instead of the single regulator circuit 152' and the pair of regulators 294 in FIG. 15.

Each regulator circuit 152" includes a first regulator 158" and a second regulator 160" that are coupled between respective positive terminals 338 of capacitors C9–C16, similar to that of regulators 158' and 160' and capacitors C2, C3, C6, and C7 in FIG. 15, via input terminals 309' and output terminals 310'. Diodes D5–D8 are coupled between the regulators 158" and 160" and respective secondary reception legs 334. Cathode terminals 339 of diodes D5–D8 are coupled to the regulators 158" and 160" and anode terminals 340 of diodes D5–D8 are coupled to legs 334.

Negative terminals 342 of capacitors C9, C10, C13, and C14 are coupled to output terminals 292'*a*, 292'*b*. Negative terminals 344 of capacitors C11, C12, C15, and C16 are coupled to common output terminal 296'. Positive terminals 338 of capacitors C10, C12, C14, and C16 are coupled to ground terminal 258.

Figure 17:
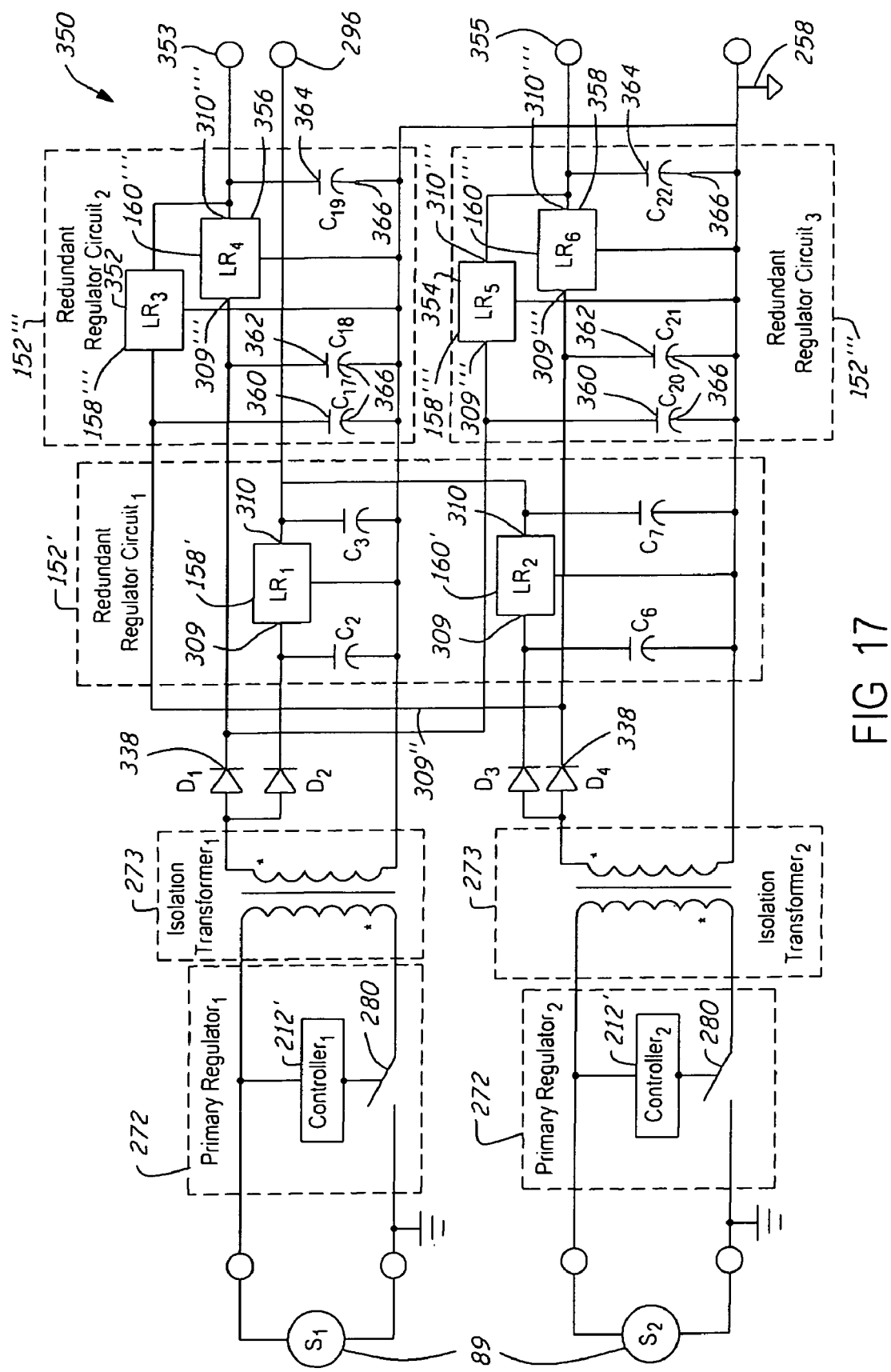
FIG. 17 is a block diagrammatic and schematic view of a triple redundant power distribution system incorporating use of three redundant regulator circuits in accordance with another embodiment of the present invention.

Referring now to FIG. 17, a block diagrammatic and schematic view of a triple redundant power distribution system 350 incorporating use of redundant regulator circuits 152" in accordance with another embodiment of the present invention is shown. The embodiment of FIG. 17 is an example modification of the embodiment of FIG. 15 to provide increased reliability; of course other various modifications may be performed to the embodiment of FIG. 15 as well as to other embodiments of the present invention to further increase reliability. The present invention thus may be easily modified to provide various levels of reliability depending upon the application.

The regulators 294 and capacitors $C_4$ and $C_8$, of FIG. 15, are replaced with a pair of redundant regulator circuits 152'''. Each redundant circuit 152''' has a first regulator 158''' and a second regulator 160'''. First regulator 352 is coupled to the cathode terminal 338 of diode $D_4$ and to output terminal 353, via input terminals 309'' and output terminals 310'''. A first regulator 354 is coupled to the cathode terminal 338 of diode $D_1$ and to output terminal 355, via input terminals 309''' and output terminals 310''. Second regulator 356 is coupled to the cathode terminal 338 of diode $D_1$ and to output terminal 353, via input terminals 309''' and output terminals 310'''. Second regulator 358 is coupled to the cathode terminal 338 of diode $D_4$ and to output terminal 355, via input terminals 309'' and output terminals 310'''.

Positive terminals 360 of capacitors $C_{17}$ and $C_{20}$ are coupled to input terminals 309'' and 309''' of regulators 352 and 354, respectively. Positive terminals 362 of capacitors $C_{18}$ and $C_{21}$ are coupled to input terminals 309'' and 309''' of regulators 356 and 358, respectively. Positive terminals 364 of capacitors $C_{19}$ and $C_{22}$ are coupled to output terminals 310'' and 310''' of regulators 352–358, respectively. Negative terminals 366 of capacitors $C_{17}$–$C_{22}$ are coupled to ground terminal 258.

For further increased reliability the systems 150, 150' 270, 330, and 350 of FIGS. 11 and 14–17 may be modified to include input distribution switches coupled between the sources 89 and the primary regulators, as is shown in FIGS. 6 and 9.

Referring now to FIG. 18, a logic flow diagram illustrating a method of redundantly supplying and distributing power from a plurality of power sources to a plurality of loads in accordance with another embodiment of the present invention is shown. Although, for simplicity the following method steps are described with respect to the embodiments of FIG. 11, they may be modified and applied to other embodiments of the present invention.

In step 400, the primary regulators coarsely regulate and convert multiple power inputs received from the power sources 89.

In step 402, the isolation transformers bi-directionally isolate coarsely regulated power out of the primary regulators from the redundant regulator circuit 152 and generate isolated power for the regulator circuit 152.

In step 404, the regulators 158 and 160 finely regulate the isolated power to generate multiple power outputs.

In step 406, redundant power from the regulators 158 and 160 is combined. Thus, whether a component in the first line 168 or in the second line 174 is malfunctioning the dual distribution system 150 remains operable and supplies a proper power level.

The above-described steps are meant to be an illustrative example the steps may be modified depending upon the application.

The present invention provides a redundant power distribution system that is capable of being modified to provide varying levels of redundancy while at the same time minimizing the number of system components and thus, weight and costs of the system. The present invention in its simplest form reduces the minimum number of converters within a triple redundant power distribution system by one, from the traditional three converters as shown in FIG. 1, to two, as shown in FIGS. 6–10, or in other words from a R(2/3) system to a R(1/2) system. The present invention may be modified to form R(M/N) systems or devices having various levels of reliability.

The above-described apparatus and method, to one skilled in the art, is capable of being adapted for various applications and systems known in the art. The above-described invention can also be varied without deviating from the true scope of the invention.

What is claimed is:

1. A redundant power distribution system having a plurality of distribution lines comprising:

a plurality of regulators provided for respective ones of a plurality N of distribution lines, wherein said plurality of regulators are primary regulators;

a plurality of isolation transformers coupled to said plurality of regulators and having a plurality of isolation boundaries; and at least one redundant regulator device circuit coupled to said plurality of isolation transformers where M (integer) of the N (integer) plurality of distribution lines are required to be operable so that the system operates properly, wherein said at least one redundant regulator device circuit comprises a plurality of secondary regulators;

said plurality of regulators, redundant regulator device circuit, and isolation transformers forming a non-feedback looped configuration across said plurality of isolation boundaries.

2. A redundant power distribution system comprising:
a plurality of primary regulators provided for respective ones of a plurality N of distribution lines;
a plurality of isolation transformers having inputs electrically coupled to said plurality of primary regulators;
at least one redundant regulator circuit, electrically coupled to said plurality of isolation transformers, is one in which M (integer) of N (integer) distribution lines are required to be operable for the system to operate properly, and forms a non-feedback looped configuration across the plurality of distribution lines; and
a plurality of secondary regulators electrically coupled to outputs of said plurality of isolation transformers.

3. A system according to claim 2 wherein said plurality of primary regulators comprises at least one controller comparing a primary voltage with a reference voltage and generating an error signal, said controller adjusting voltage output of said plurality of isolation transformers in response to said error signal.

4. A system according to claim 2 wherein said at least one redundant regulator circuit comprises at least a portion of said plurality of secondary regulators.

5. A system according to claim 2 wherein said at least one redundant regulator circuit is a single integral unit.

6. A system according to claim 2 wherein said plurality of secondary regulators have a common output.

7. A system according to claim 2 wherein said at least one redundant regulator circuit is electrically coupled to each of said plurality of isolation transformers.

8. A system according to claim 2 wherein said at least one redundant regulator circuit comprises:
    a first redundant regulator circuit coupled to a first isolation transformer and to a second isolation transformer; and
    a second redundant regulator circuit coupled to said first isolation transformer and to said second isolation transformer.

9. A system according to claim 8 wherein said at least one redundant regulator circuit comprises a third redundant regulator circuit coupled to said first isolation transformer and to said second isolation transformer.

10. A system according to claim 2 further comprising at least one distribution switch electrically coupled to said plurality of primary regulators.

11. A system according to claim 10 wherein said at least one distribution switch comprises:
    a first distribution switch electrically coupled to a first primary regulator of said plurality of primary regulators; and
    a second distribution switch electrically coupled to a second primary regulator of said plurality of primary regulators.

12. A method of redundantly supplying and distributing power from a plurality of power sources to a plurality of loads comprising:
    coarsely regulating power received from a the plurality of power sources to the plurality of loads;
    isolating said coarsely regulating power from power received by at least one redundant regulator circuit which forms a non-feedback looped configuration across the plurality of power sources; and
    finely regulating said power received by said at least one redundant regulator circuit to generate a plurality of redundant power outputs to the plurality of loads in a number as required to maintain operability for said power-supplied loads.

13. A method according to claim 12 further comprising combining said plurality of redundant power outputs.

* * * * *